United States Patent
Van Amstel (10) Patent No.: US 7,274,498 B2
(45) Date of Patent: Sep. 25, 2007

(54) POST-OBJECTIVE SCANNING DEVICE

(75) Inventor: Willem Dirk Van Amstel, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 63 days.

(21) Appl. No.: 10/549,884

(22) PCT Filed: Mar. 18, 2004

(86) PCT No.: PCT/IB2004/050278

§ 371 (c)(1),
(2), (4) Date: Sep. 16, 2005

(87) PCT Pub. No.: WO2004/083934

PCT Pub. Date: Sep. 30, 2004

(65) Prior Publication Data

US 2006/0176409 A1    Aug. 10, 2006

(30) Foreign Application Priority Data

Mar. 21, 2003   (EP) ................... 03100734

(51) Int. Cl.
*G02B 26/08* (2006.01)
(52) U.S. Cl. ..................................... 359/206; 359/216
(58) Field of Classification Search ................ 359/206, 359/207
See application file for complete search history.

(56) References Cited

U.S. PATENT DOCUMENTS 4,213,157 A      7/1980   DeBenedictis et al.
5,543,825 A  *  8/1996   Fisli et al. .................. 347/243

FOREIGN PATENT DOCUMENTS

EP              0653877              5/1995

* cited by examiner

*Primary Examiner*—Euncha P. Cherry (57) ABSTRACT

A post-objective scanning device using a rotatable polygon mirror has a correction system for achieving telecentric scanning with a well-corrected scanning spot. A mirror facet tracker is provided to obtain high radiation efficiency and optimum use of the correction system. The facet tracker may be an active device including an additional beam deflector or a passive device including a facet tracking mirror.

16 Claims, 4 Drawing Sheets

POST-OBJECTIVE SCANNING DEVICE

This invention relates to an optical scanning device for scanning a surface along a line, which device comprises a radiation source unit for supplying at least one primary radiation beam, an optical system for focusing the beam to a spot on the surface to be scanned, and a rotatable polygon mirror comprising a number of mirror facets for deflecting the beam through a variable deflection angle, thereby obtaining a scanning beam, and to direct the scanning beam to a position on the surface to be scanned, said optical system comprising a main imaging system, which is arranged in the radiation path of the scanning beam between the radiation source unit and the polygon mirror, and a correction system which is arranged in the radiation path of the scanning beam between the polygon mirror and the surface to be scanned.

The primary radiation beam is understood to mean the beam travelling along that portion of the total beam path extending from the radiation source up to the incidence on a facet, which incidence converts the primary beam into the scanning beam. The primary is thus formed of the same radiation as the scanning beam, but precedes this beam. The radiation source unit may comprise a single radiation source or a number of such sources for supplying a number of beams allowing so-called "multi-spot scanning".

A scanning device of this type is described in U.S. Pat. No. 5,013,108, which is in the name of the applicant of the current application. The contents of that application are incorporated herein by reference.

Most scanning devices are pre-objective scanners that use a scan lens which has the function of focusing a beam after deflection by the deflection system. Pre-objective systems also allow field flattening and optionally provide telecentricity for the beam, which means that the beam portions forming different image points all have their chief ray at the same angle, usually perpendicular, to the image plane.

Figure 1:
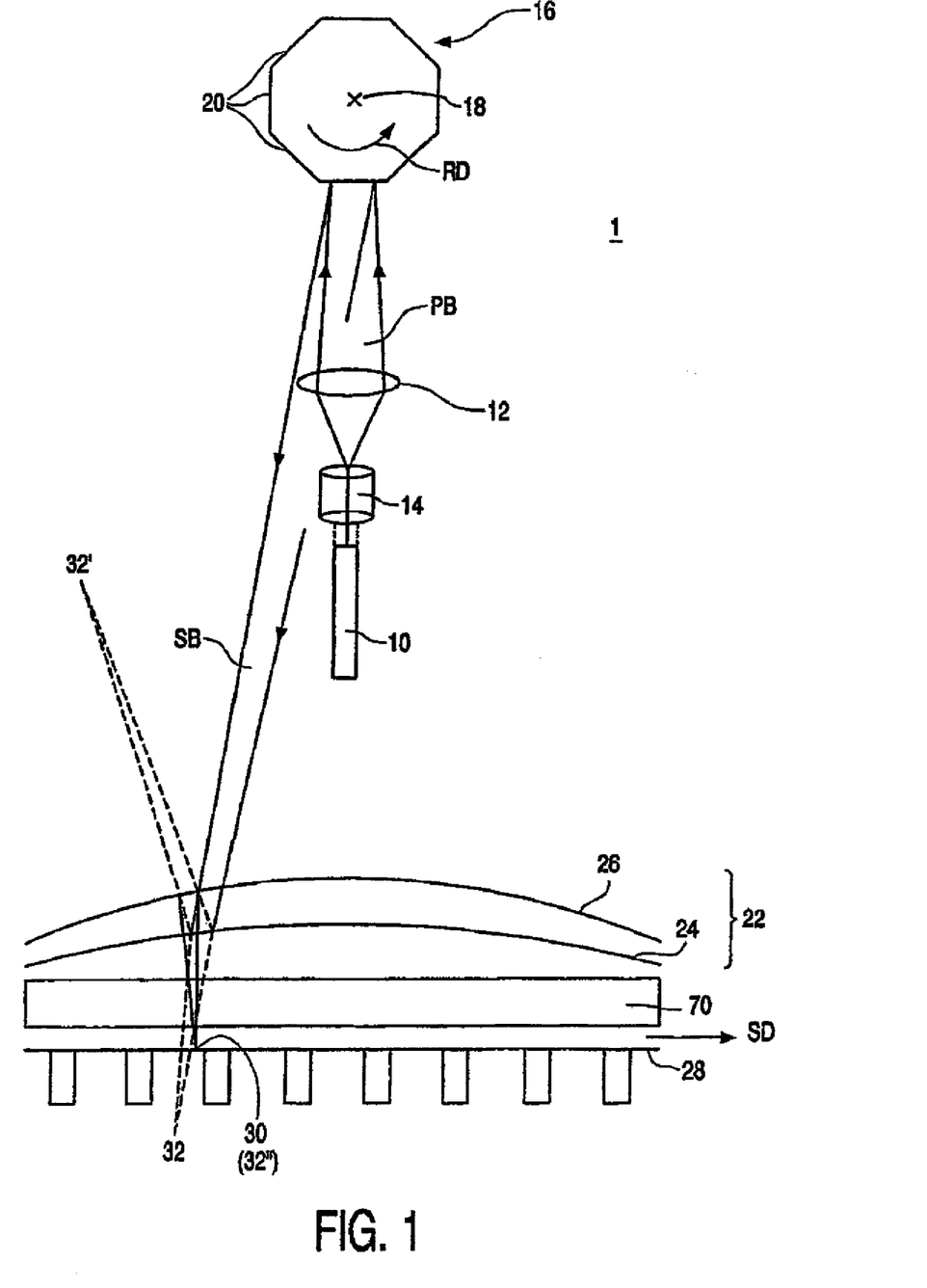
FIG. 1 shows a schematic diagram of a prior art post-objective scanning device provided with a Banana Mirror System.

The scanning device described in U.S. Pat. No. 5,013,108 by contrast, is a post-objective scanner as shown in FIG. 1 of U.S. Pat. No. 5,013,108. A scanning device of this type uses a relatively simple spot forming/focusing main lens located prior to a deflection system. This post-objective scanning device has a reflective optical correction system located after the deflection system. The surface to be scanned is denoted by reference number. The field correction system described in U.S. Pat. No. 5,013,108 is a sophisticated system, which not only provides a flat image field and telecentricity, but also corrects for aberrations in the scanning spot, like coma and spherical aberration. This correction system is called the Banana Mirror System (EMS) and consists of a set of two cylindrical mirrors, a first convex and a second concave with a stronger power than the first, preferably a set of a convex hyperbolic cylindrical mirror and a concave parabolic cylindrical mirror.

The correction capabilities of the Banana Mirror System can be used in an optimum way if the scanning beam incident on this system satisfies the requirement that the point of deflection of this beam, i.e. the point of hinging of the beam coming from the deflected device, is located at an ideal position. Such an ideal scanning beam could be realized by means of a galvanometer-mirror type deflector. However such a deflector shows a pure duty cycle. After the mirror has been moved, during a scan time interval, in the forward direction to realise a first scan, it has to be moved, during a dead time interval, in the backward direction to reposition the mirror in its initial position before a second scan can be performed. The duty cycle is defined as the ratio of the scan time interval and the sum of this time interval and the dead time interval.

With respect to the duty cycle, an ideal deflection system would be a continuous rotating polygon mirror. However the mirrors, or facets, of the polygon should be over-filled in order to allow using the correction capabilities of the Banana Mirror system. Over-filling the facets is understood to mean that the cross-section of the primary beam incident on the mirror polygon is considerably, for example two times, larger than the size of a facet. As at any time only radiation from one facet is used to form the scanning spot, a scanning system using a mirror polygon with over-filled facets poses the alternative problem of poor radiation efficiency, i.e. only a portion of the primary beam radiation is used to form the scanning spot. Moreover, as the primary beam is truncated by the facet edges, diffraction effects occur at these edges, which affects the quality of the scanning spot.

It is an object of the invention to provide a post-objective scanning device as defined in the opening paragraph, which shows maximum radiation efficiency, is very well corrected for aberration and has a high resolution. The scanning device according to the invention is characterized in that it comprises facet-tracking means for deflecting the primary focused beam in synchronism with rotation of the polygon mirror such that the chief ray of the primary beam is continuously directed at substantially the centre of the facet that is momentarily illuminated by the primary beam.

By introducing facet-tracking with a focused beam in a post-objective scanning device comprising a Banana Mirror System, a stationary deflection point is created for the scanning beam, which allows using the correcting and telecentric capabilities of the Banana Mirror System to the optimum. As the primary beam is a focussed beam, and the illuminated facet is under-filled, the scanning device shows a high radiation efficiency.

It is remarked that a scanning device with tracking of the polygon mirror facets is known per se. However the known devices with facet-tracking are pre-objective scanners wherein facet-tracking is performed by a parallel beam, which is moved is linearly moved across the facet that is momentarily used for deflecting the scanning beam.

Although the invention is in first instance intended to be used in a scanning device having a Banana Mirror System, it may also be used in post-objective scanners having other types of correction systems, be means of which the required aberration correction and telecentricity can be achieved.

Preferably, the scanning device is further characterized in that the tracking means ate operable to create a deflection point for the scanning beam, which point is located between a centre of rotation of the polygon mirror and the mirror facet upon which the primary beam is momentarily incident.

Said point is called the ideal deflection point, whereby ideal means ideal with respect to the Banana Mirror System, which, if receiving radiation from this point, functions optimally.

The invention can be implemented in several embodiments, which can be classified in two main embodiments. A first main embodiment is characterized in that the facet-tracking means are active tracking means, which are constituted by a beam deflector arranged in the radiation path between the radiation source unit and the main imaging system.

This beam deflector is driven in synchronism with the rotation of the polygon mirror, such that a virtual deflection point for the scanning beam is created, which point is located within the polygon mirror and is stationary.

The main embodiment is preferably further characterized in that an additional lens is arranged between the beam deflector and the main imaging system to magnify the deflection produced by the beam deflector.

The additional lens, which may be called deflection-magnifying, or tracking-magnifying lens, has such power that it forms a reduced image of the radiation emitting spot of the radiation source unit whilst it magnifies the deflection provided by the beam deflector. This allows reducing the deflection required from the beam deflector and enlarging the cross-section of the primary beam incident on this deflector. These two effects contribute to enhanced performance of the beam deflector.

Sub-embodiments of the main embodiment differ from each other by the type of beam deflector they use. The beam deflector may comprise a galvanometer mirror, a piezoelectrical mirror, an acousto-optical deflector, or -modulator used as a deflector or an electro-optical deflector. These deflectors are well-known to the person skilled in the art, their application in a post-objective scanning device is new. The two deflectors have no moving parts and can be driven at high frequencies.

The second main embodiment of the scanning device is characterized in that the facet tracking means are passive means comprising a facet tracking mirror, which receives the primary beam via a first reflection at the mirror facet and reflects the beam to the mirror facet for a second reflection at this facet to deflect the primary beam at an angle substantially smaller than the deflection angle of the scanning beam.

The mirror facet that is momentarily used to deflect the scanning beam is now also used to create a deflection of the primary beam, so that a special beam deflector and its driven circuit are no longer needed. As for facet tracking and beam scanning the same facet is used, irregularities in the polygon mirror do not affect the quality of scan movement and of the scan spot.

The second embodiment may be further characterized in that the facet-tracking mirror is a concave mirror.

Preferably this embodiment is further characterized in that the centre of curvature of the concave mirror is located close to the rotational axis of the polygon mirror.

By arranging the centre of curvature not on the rotational axis, but close to it, the primary beam, which has undergone a first and second reflection at the mirror facet and intermediate a reflection at the facet tracking mirror is deflected by the moving facet over a small deflection angle. This deflection, which may be called mini deflection, is substantially smaller than the deflection of the scanning beam, but sufficient for the required facet-tracking.

The invention can be used in a number of applications, which can be divided into two main groups, or types of apparatus.

The first apparatus is for processing a pattern in at least a surface layer of an object, which apparatus comprises a device for scanning the object surface with a radiation beam and means to modulate the intensity of the beam according to the pattern.

Processing a pattern in at least a surface layer of an object includes several types of processes, like laser machining an object or writing a pattern in the object by means of radiation or writing a pattern in a resist layer on top of the object, or substrate, as part of a mask less lithographic process. Such an apparatus according to the invention is characterized in that the device is a scanning device as described herein above.

The second apparatus is for point-wise retrieving details of an object, which apparatus comprises a device for scanning the object with a beam of radiation and a radiation-sensitive detection system to convert radiation from the object into an electrical signal.

Point-wise retrieving details is to be interpreted broadly. It includes inspection of objects during manufacturing, such as printed circuit boards, wherein the details are, for example solder pads, or inspection of intermediate or end products. It also includes point-wise scanning of an object, such as a photograph or a drawing to retrieve the image information stored in the object, wherein the said details are image elements (pixels). Such an apparatus according to the invention is characterized in that the device is a scanning device as described herein above.

This apparatus may be of the reflective type or of the transmission type.

The first type of apparatus is characterized in that the radiation-sensitive detection system and the scanning device are arranged at the same side of the object.

The second type of apparatus is characterized in that the radiation-sensitive detection system is arranged at the position of a radiation source of the scanning device and radiation source is arranged at the side of the object remote from the scanning device.

These and other aspects of the invention are apparent from and will be elucidated, by way of non-limitative example, with reference to the embodiments described hereinafter.

FIG. 1 shows a schematic diagram of a post-objective scanning device 1, as described in U.S. Pat. No. 5,013,108. This device comprises a radiation source 10, for example a laser, which supplies a primary radiation beam PB. This beam passes through a main imaging system 12, which, in combination with a correction system 22, images the radiation emitting window of the radiation source in the plane of a surface 28 to be scanned and forms a scanning spot 30 in this surface. The imaging system is currently a lens system comprising one or more lens elements, for example an aspherical lens, but may also be a mirror system. Between the radiation source and the main imaging system further optical elements 14, such as beam shaping elements, may be arranged. The primary beam from the imaging system is incident on a reflective polygon 16, which rotates about an axis 18 and comprises a number of mirrors, or reflective facets 20. A facet of the polygon that is momentarily illuminated by the primary beam PB reflects the beam towards the surface 28. Upon rotation of the polygon 16 the illuminated facet deflects the reflected beam in the plane of the drawing of FIG. 1 so that the scanning spot 30 is moved across the surface 28. The beam that is reflected by a polygon facet is called scanning beam SB hereinafter.

Between the polygon 16 and the surface 28 an optical correction system 22 is arranged. This system comprises two curved mirrors 24 and 26. Mirror 24 is convex and has a hyperbola-cylindrical shape with the generatrix being parallel to the axis of rotation of the polygon 16, thus perpendicular to the plane of drawing of FIG. 1. The mirror 26 is concave and has a parabola-cylindrical shape. Because of the shape of the mirrors of the correction system 22, this system is called Banana Mirror System (BMS).

The main imaging system 12 images the radiation source 10 in image point 32, which is located below the surface to be scanned. The mirror 24 reduces the convergence of the scanning beam SB so that this mirror re-images image point 32 in image point 32', which is located at a larger distance from mirror 24 than image point 32. The mirror 26 focuses the scanning beam on the surface 28 and re-images image point 32' in image point 32", or scanning spot 30, which spot has a minimum size. The shape and position of mirrors 24 and 26 are chosen such that curved scan line generated by the rotating polygon is converted in a straight line, that the scanning device is telecentric at the image side and that the scanning spot shows minimum aberrations.

More information about the post-objective scanning device can be found in U.S. Pat. No. 5,013,108 and in the article: "Principles of the Ideal scanner Model—an analytical theory of the banana mirror system" by the inventor of the present invention in: SPIE Vol. 3787 "Optical Scanning: Design and Application" 1999, pages 138-148. As described in this article a simple cylindrical lens may be arranged between the Banana Mirror System and the surface 28 to correct for wobble of the scan line, i.e. the line described by the scanning spot. This wobble may occur due to imperfections of the polygon mirror 16.

FIG. 1 shows a scanner design in which the rotational axis of the mirror polygon is arranged symmetrically with respect to the axis of the chief ray of the primary beam PB and the main imaging system. This design is preferred for the embodiments described herein. However the invention may also be used in a scanning device designed as shown in FIG. 1 of U.S. Pat. No. 5,013,108.

The advantages of the Banana Mirror System are only obtained with a scanning beam which, viewed from the Banana Mirror System, is deflected at a point that is located at a determined and fixed position. Such an ideal deflection point ID is obtained when use is made of a galvanometer mirror system to generate a scanning beam. As a mirror polygon deflector shows better performance with respect to scanning speed and resolution, it is however preferred to use such a mirror polygon in combination with the Banana Mirror. Reasonable results can be achieved if the facet that is momentarily used is over-filled by the primary beam. Over-filling the facets has the disadvantages that only part of the radiation of the primary beam is used for scanning and that diffraction of radiation at the edges of the facet affects the quality of the scanning spot.

Figure 2:
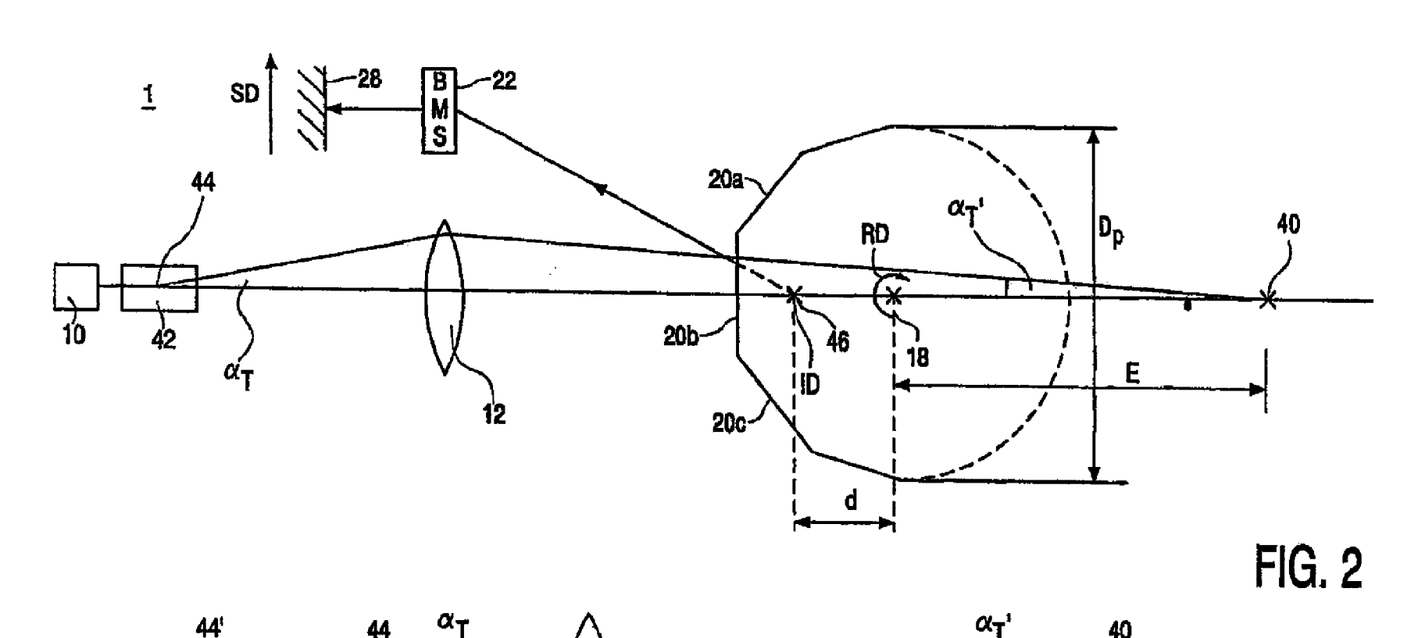
FIG. 2 shows a schematic diagram of such a device provided with a first embodiment of active facet tracking according to the invention.

These disadvantages do not occur if, according to the invention, the cross-section of the primary beam at the location of the momentarily used facet is smaller than the facet, i.e. is under-filled, and the primary beam is deflected in synchronism with polygon rotation such that the chief ray of this beam is directed at the centre of the facet at any time. In other words, it is arranged that the primary beam follow the facet, which is called facet tracking. In this way an ideal and stationary deflection point for the scanning beam is created. FIG. 2 schematically shows a cross-section, in the plane of the scanning movement, of a first embodiment of a scanning device according to the invention. This Figure shows only those elements, which are relevant for the invention. The scanning device comprises a radiation source, preferably a laser, which supplies the primary beam PB. In the path of the primary beam a main lens system, or objective system, 12 is arranged, which focuses the beam in a virtual spot at point 40. Behind the main lens system a rotating polygon mirror 16 is arranged which axis of rotation is denoted by reference number 18. The polygon mirror has a number, for example between 12 and 24, of reflective facets 20a, 20b, 20c etc, of which only a few are shown in FIG. 1 after reflection of the beam at the polygon mirror, virtual point 40 is imaged in point 32 of FIG. 1.

The momentarily illuminated facet, facet 20b in FIG. 2, reflects the incident beam and deflects this beam over a pre-determined scan angle, so that the beam from the polygon mirror is a scanning beam SB. This beam passes through the Banana Mirror System (BMS) 22 and is focused by means of the main imaging system and the BMS in a scanning spot 30 on the surface 28 to be scanned.

In the plane perpendicular to the scan plane the beam may be focused on the surface to be scanned 28 or in the case of passive wobble reduction on or near a reflective facet 20 of the reflective polygon. In the latter case, an elongated cylindrical mirror arranged between the Banana Mirror System and surface 28 focuses the diverging beam from the facet on the surface 28.

An additional beam deflector 42 is arranged behind the radiation source 10 to deflect the primary beam over a small angle of deflection $\alpha_T$ and thus providing active facet tracking. The deflected primary beam has a deflection point 44 that is located within the beam deflector 42. This point of narrowest beam constriction, and more general the first point of narrowest primary beam construction as seen from the polygon mirror, will be called primary spot.

The beam deflector may be an acousto-optical deflector (AOD) or an acousto-optical modulator (AOM), which can be used in a deflection mode by modulating the frequency of the driving signal, a galvanometer mirror deflector, a piezo mirror deflector or an electro-optical deflector (EOD). These types of devices can be driven at high speeds and generally have a limited maximum deflection angle. However, given that only a small angle of deflection $\alpha_T$ is required, these types of deflectors are suitable for the present application.

The deflection of the primary beam PB is controlled in concert with the rotation of the reflective polygon 16, so that as the polygon 16 rotates, the beam deflector 42 provides deflection which seeks to ensure that the primary beam keeps more or less centred on the facet 20a-c. Synchronization of the primary beam deflection and polygon rotation can be realized by providing the polygon mirror with a rotation sensor and coupling the output signal of this sensor to the driving circuit for the beam deflector 42. These means are not shown in FIG. 2; for a person skilled it is evident how to realize the required synchronization.

As a result of the active facet tracking, the scanning beam being deflected by the polygon 16 and reflected by a facet 20b has a virtual deflection point 46 on the optical axis of the primary beam about halfway between the rotational axis 18 of the polygon 16 and the facet 20a-c. This deflection point is an ideal deflection point ID seen from the BMS 22, which means that point 32 in FIG. 1 should rotate around this point. Its position can be expressed in its distance d from the rotational axis 18 of the polygon 16, which distance is given by:

$$d = \frac{E \cdot Dp}{4E + Dp} \approx \frac{Dp}{4} \text{ for } E \gg Dp,$$

where E is the distance from the virtual focus point 40 to the rotational axis 18 and Dp is the diameter of the inscribed circle of the polygon 16, and where d and e are dimension measured in the same plane as Dp.

Imparting, by means of facet tracking, the ideal deflection point to the scanning beam, allows on any time in the scanning process optimum correction of this beam by means of the Banana Mirror System. Without facet tracking there would be for any facet moving through the beam only one position at which facet reflection is optimum for the Banana Mirror System.

Facet tracking of an under-filled facet with a convergent beam eliminates the usual disadvantages of an under-filled facet system, which are: low duty cycle, no telecentricity at the surface to be scanned and poor correction by the Banana mirror system. As in a system with under-filled facet the beam incident on the facet is stationery and has a cross-section smaller than the facet in the scan direction, one has to wait after a first scan with a first facet for a next facet reflecting the full width of the beam. The facet edge between two adjacent facets has to pass before a new scan can start, which causes duty cycle loss.

Such a duty cycle loss does not occur in a system with over-filled facet, because the next facet is filled already at the end of scan of the previous facet so that there is no or hardly any waiting time. A system with facet over-filling, such as a pre-objective system wherein a parallel beam is used or a post-objective system wherein a focussed, but over-filling, primary beam is used, has a low radiation efficiency. Moreover, diffraction of radiation at the facet edges affects the quality of he scanning spot. These disadvantages do not occur in the scanning device with facet tracking by a convergent beam. Because of the its convergence, the scanning beam may have a large beam aperture so that the resolution of the device may be high. This is an additional advantage of scanning device of the invention, which combines the advantages of the facet under-filling and the facet over-filling systems.

The amplitude of movement of the beam deflector 42 is chosen to ensure that the primary beam is deflected at an angle sufficient to maintain the beam in line with the centre of the facet 20a-c. Consequently, the choice of beam deflector 42 depends on the position and construction of polygon 16.

The duty cycle of a scanning system with active facet tracking is determined by the retrace time of the beam deflector 42 and can be high.

Whereas in known scanning devices facet tracking is performed by a parallel beam, which is linearly moved with respect to the facet, in the new device for facet tracking a converged, or focused beam is used, which is deflected with respect to the facet. In the scan plane, i.e. the plane of drawing of FIG. 2 the beam is virtually focused in the post-objective virtual aiming point 40. In the plane perpendicular to the scan plane the beam may be focused on the surface to be scanned Or at the polygon mirror 16. The latter will be the case if passive wobble correction, by means of a cylindrical lens between the Banana Mirror System and the surface 28, is used.

Figure 3:
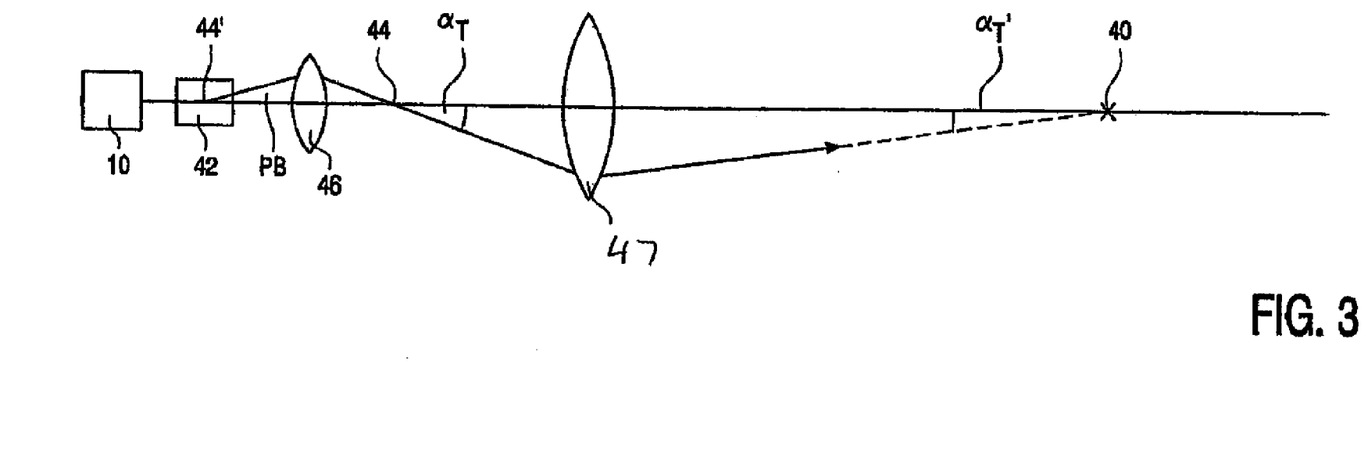
FIG. 3 shows a schematic diagram of a second embodiment of active facet tracking.

FIG. 3 schematically shows an improved embodiment of a scanning device with active facet tracking. In this FIG. only the features, which distinguishes this embodiment from that of FIG. 2 are shown. In the device of FIG. 3 an additional lens or—system 47, which may be called magnifying tracking lens, is arranged between the beam deflector 42 and the main imaging system 12. The lens 47 focuses the beam from the beam deflector 42 at a position between this lens and the main imaging lens 12, i.e. re-images the original primary spot in the beam deflector of FIG. 2 in a new spot at this location. This new spot 44 is the primary spot in the device of FIG. 3, according to the definition of primary spot given herein above. The spot 44' in the beam deflector 42, which is conjugated with the primary spot 44 may be called pre-primary spot.

The magnifying tracking lens 47 magnifies the deflection provided by the beam deflector 42. This lens, together with the main lens 12 act to focus the primary beam on the virtual aiming point 40 behind the polygon mirror, as in the device of FIG. 2. Aiming point 40 is conjugated with the deflection point 44 or 44' (in the beam deflector 42).

The magnifying tracking lens 47 allows substantially reducing the required deflection by the beam deflector to achieve the same deflection at the location of the polygon 16 as in the device of FIG. 2. The reduction may be a factor of ten. This allows using the better properties the beam deflectors, mentioned herein above, have at low deflection angles. The amplitude of tracking angle deflection required from the beam deflector 42 is reduced by a factor M, M being the linear magnification with which spot 44 is imaged onto spot 44' by the magnifying tracking lens (MTL) 47. Thus M is the ratio between the distance from spot 44' to MTL 28 and the distance from MTL 28 to spot 44. In other words the MTL 47 performs a linear demagnification from spot 44' towards spot 44 by 1/M and, as a consequence, it performs in this direction an angular magnification by M. So as a result the spot 44' is M times larger than spot 44 and the maximum tracking angle $\alpha_T$ at point spot 44' is M times smaller than required at spot 44. Thus the deflection by the additional deflector 42 required in the embodiment of FIG. 3 is M times smaller than required in the embodiment of FIG. 2.

Apart from the advantage of the smaller required tracking angle at spot 44', the MTL 47 offers the additional advantage of a larger beam size at the surface of the additional deflector 42. This reduces contamination sensitivity and reduces high optical power density problems. Also the diffraction efficiency of an AOD, AOM or some types of EOD, when used as a beam deflector 42, becomes higher with a larger spot size, because its own beam divergence is smaller. So by choosing an appropriate value for M with the MTL 47, the system can be tuned to optimum working conditions with respect to the maximum tracking angle and the spot size for the additional, or tracking, deflector at spot 44'. As an example, if the maximum deflection angle at spot 44 is 33 mrad, this angle is 3.3 mrad at spot 44', whilst if spot 44 is 30 μm, spot 44' is 300 μm.

Figure 4:
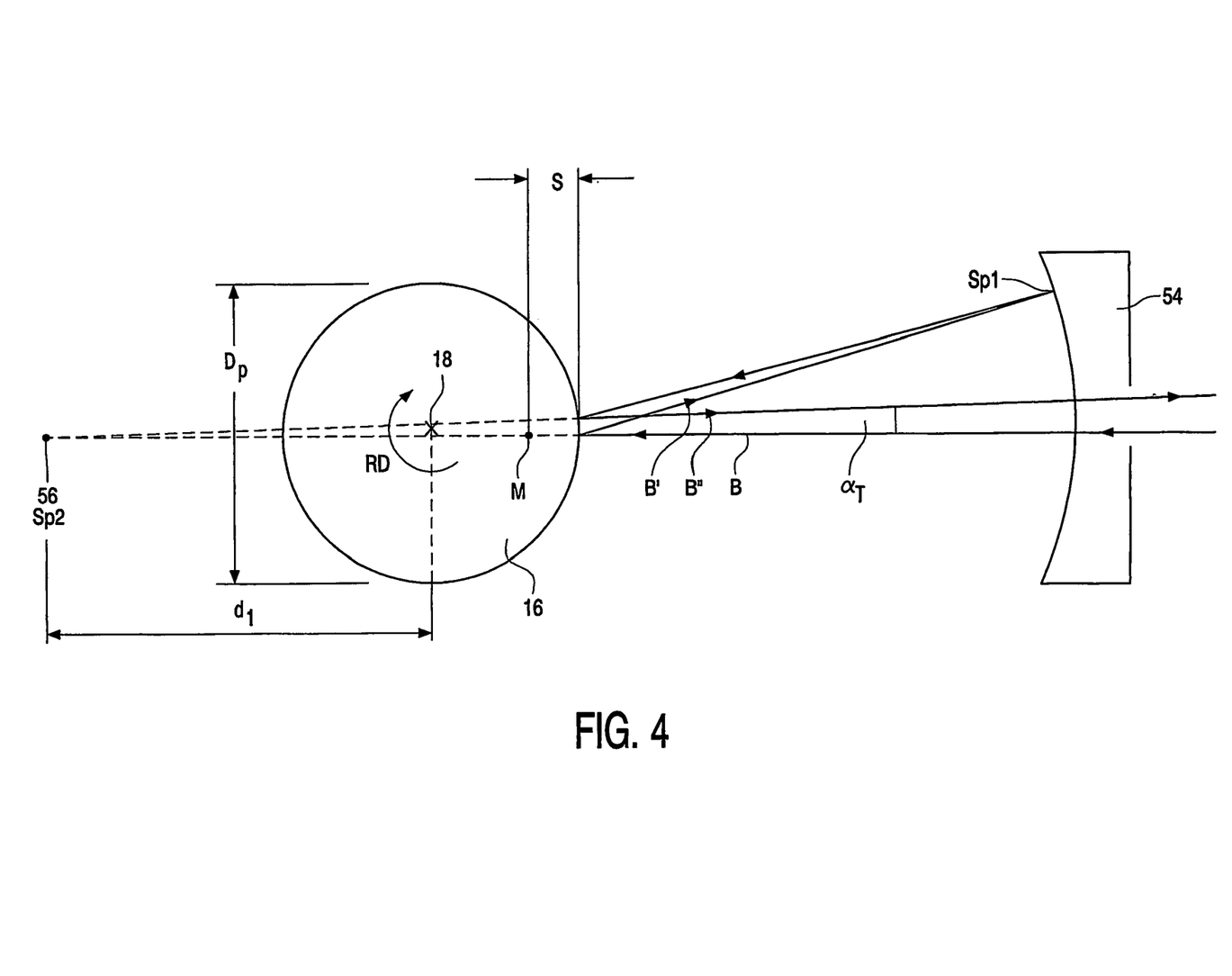
FIG. 4 shows a schematic partial diagram of an embodiment of passive facet tracking according to the invention.
Figure 5:
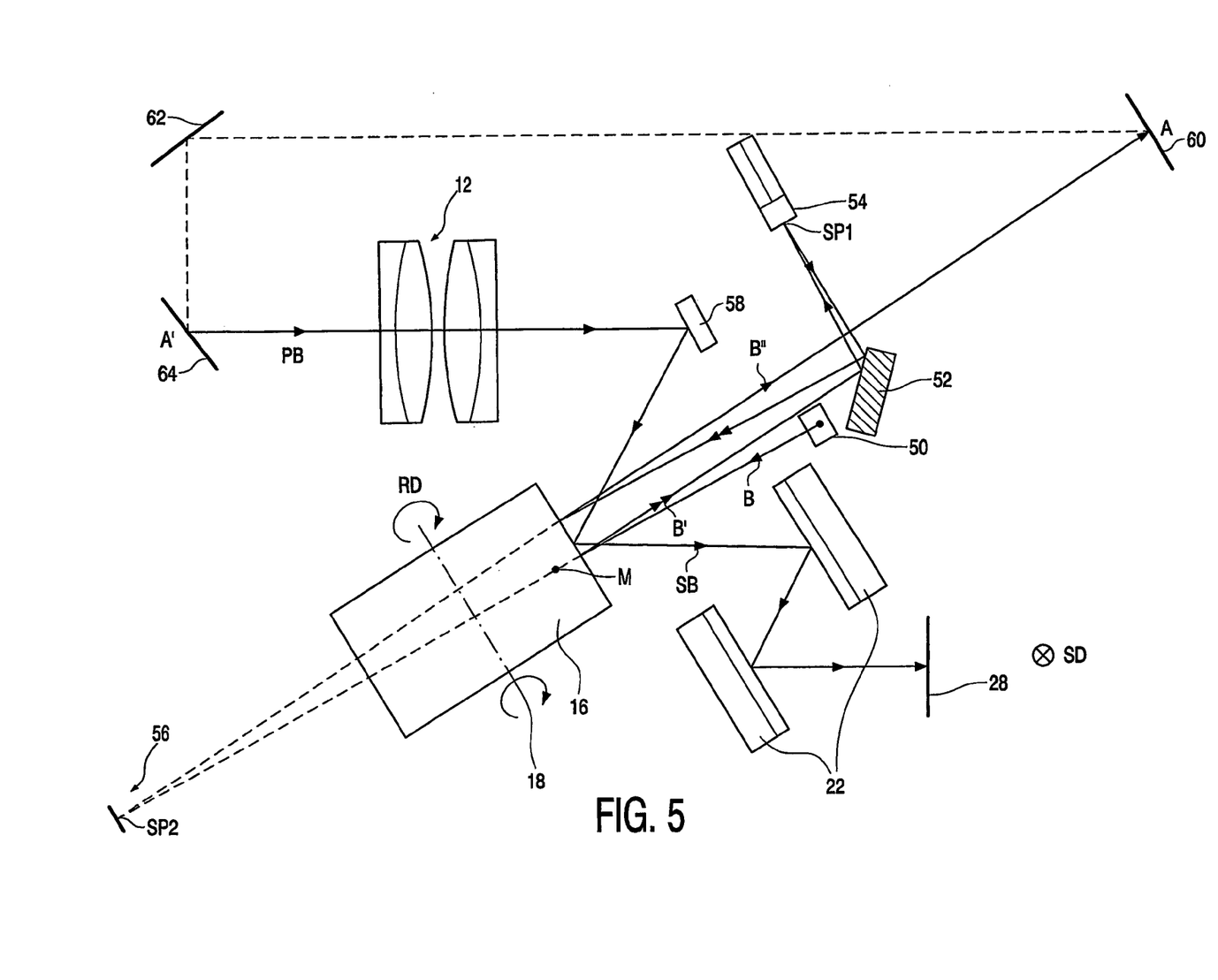
FIG. 5 shows a schematic diagram of a post-objective scanning device provided with passive facet tracking according to the invention.

FIGS. 4 and 5 show the principle of an active facet tracking and a scanning device provided with such a facet tracking respectively. FIG. 4 shows a cross-sections through the plane of the scanning direction, which is denoted by the arrow SD as in the preceding Figures. FIG. 5 shows a cross-section through the plane of the polygon rotation direction, which is denoted by the arrow RD as in the preceding Figures, which plane is perpendicular to the scanning direction.

Passive facet tracking does not need the beam deflector and the means for driving this deflector in synchronism with the rotation of the polygon mirror of the active facet tracking. Optionally, in passive facet tracking a magnifying tracking lens, such as lens 47 in FIG. 3 may be used.

As shown in FIG. 5, a beam B from a radiation source, not shown and preferably a laser, is coupled into the facet tracking system by means of a mirror 50. This mirror reflects the beam to a facet 20b of the polygon mirror 16. This facet reflects the beam as beam (B') to a folding mirror 52, which directs beam B' to a concave, cylindrical or spherical, mirror 54, which may be called facet tracking mirror. This mirror reflects the beam B' back to the facet of the rotating polygon via mirror 52. The facet then reflects the beam outwards as beam B" towards point A, which beam, upon rotation of the polygon is deflected over a deflection angle $\alpha_T$.

In the passive facet tracking system the primary spot is preceded by more preceding, or intermediate, spots at different locations along the optical axis than in the active facet tracking system. The beam entering the scanner via mirror 50, is after a first reflection at the polygon facet, and a first reflection at the folding mirror 52, foccused in a spot SP1 at or near to the facet tracking mirror 54. After a second reflection at the folding mirror 52 and a second reflection at the polygon facet, the beam images spot SP1 onto a virtual spot $SP_2$. Spots SP2 and SP1 are mirror images of each other with respect to mirror polygon 16 and folding mirror 52.

This would be exactly the case if the centre of curvature M of the facet tracking mirror 54 is located at the facet momentarily illuminated by the incoming beam B. In that case, after the second reflection by the facet, the deflection of beam B' would be negligible. By giving the centre M a small off-set, i.e. position it at small distance s from the facet and in the polygon, as shown in FIGS. 4 and 5, a small deflection movement is imparted to the outgoing beam B". The amplitude $\alpha_T$ of this periodic deflection, which may also be called mini-scan, is determined by the off-set s. In this way the beam B" is made suitable for facet tracking. This beam has its deflection/rotation point virtually at point 56, the location of spot SP2, but in reality deflection/rotation occurs at the rotating polygon 16. Also, the focus of beam B" is located in point 56, because the second reflection at the polygon facet causes mirror-imaging of spot SPi onto spot SP2. The beam B" is guided to the main imaging system of the scanning device so that, in the terminology used in the description of FIGS. 2 and 3, the spot SP2 can be called a pre-primary spot 44' or a primary spot 44, depending on whether a magnifying tracking lens is used or not.

Referring to FIG. 4, if the centre of curvature of the facet tracking mirror 54 is located in point M and the radius of curvature of this mirror is R, the distance $d_1$ between the rotational axis 18 of the polygon 16 and the virtual focus point of the facet tracking, 56, is given by:

$$d_1 \approx R - \frac{Dp}{2} - s$$

wherein Dp is the diameter inscribed by the rotating polygon 16, and s is the small distance between M and the facet 20 when the facet 20 is perpendicular to the optical axis of the system.

The beam B" showing the small deflection amplitude and directed at point A is guided by means of folding mirrors 60,62 and 64 to the main imaging system 12 and forms, from point A' on, a facet tracking primary beam PB. Optionally and equivalent to the situation shown in FIG. 3, a magnifying tracking lens (not shown in FIG. 5) may be arranged in the radiation path between points A and A'. Consequently the virtual focus point 56 in FIGS. 4 and 5 is equivalent to point 44 in FIG. 2 or point 44' in FIG. 3. After having passed the main imaging system 12, which in this embodiment comprises two lens doublets 66 and 68, the primary beam PB is deflected by a mirror 58 to the rotating polygon mirror 16, which converts the primary beam in a scanning beam SB in the way as described with reference to FIGS. 2 and 3. The scanning beam passes the Banana Mirror System 22 to form a high quality scanning spot 30 on the surface to be scanned 28.

As the incoming beam, in particular beam B' is focused near the facet tracking mirror 54, the cross-sections of the beam at the rotating polygon 16 for the first and second reflections are still small, because the facet tracking mirror 54 is not far from the rotating polygon 16. Moreover, if the magnifying tracking lens 47 is applied, the size of spot SP2, or that of spot SP1, can be M times larger and so beam divergence will be M times smaller which helps to limit growth of the cross-section of the primary beam on its way from the virtual deflection point 56 via the main imaging system 12 to the rotating polygon.

Thus, in a scanning device with passive facet tracking three reflections at a same facet are used. By means of the first two reflections an ideal deflection point for the beam entering the Banana Mirror System is created and the third reflection is used to move the scanning beam across the surface to be scanned The scanning device with passive facet tracking shows the following advantages:
  low duty cycle loss, because the cross-section of the primary beam can be kept small;
  for facet tracking no control electronics nor an active deflection element are needed;
  imperfections of the polygon mirror such as an imperfect angular distribution of the facets over the polygon, are automatically compensated, because the same facet is used to deflect the primary beam and to perform the scanning action, and
  the tracking function can easily be tuned by shifting the facet tracking mirror.

In the embodiments described herein above only the elements, which are essential to understand the present invention and the functioning of a post-objective scanning device provided with a Banana Mirror System has been shown. The scanning device may comprise other elements for beam shaping and beam guiding. For example, optical elements may be arranged between the radiation source 10, comprising one laser or an array of lasers, and the beam deflector 42 (FIGS. 2 and 3) or the mirror 50 (FIG. 5) to focus or image the laser source or laser source array such that a small spot or an array of small spots is obtained.

The embodiments described herein above all make use of the Banana Mirror system described in U.S. Pat. No. 5,013, 108. The main features of interest in these embodiments relate to the facet tracking systems used to deflect an illumination beam in concert with a rotating reflective polygon, in order to reduce undesired optical effects when the beam is reflected from the polygon surface off axis.

However, the use of the Banana Mirror system is not essential to the invention, since a different optical set up could be used after the last reflection from the rotating reflective polygon, which different set-up could create the required telecentricity.

The post-objective scanning system with facet tracking can be used for different applications, which can be divided into two groups, namely surface treatment and surface inspection. Surface treatment includes writing information on the scanned surface 28, such as laser printing, or providing the surface with a required pattern, for example by means of laser ablation of surface material. As in the latter case a high power laser beam is used the optical system preferably comprises only mirrors instead of lenses. Surface treatment also includes writing a pattern in a resist layer on top of a substrate surface for the purpose of forming device features in at least one layer of the substrate by means of a lithographic process. This technology is known as direct writing, or mask less lithography. For surface treatment the scanning beam should be modulated in intensity in accordance with the pattern that is to be formed. This can be realized by modulating the radiation supplied by the radiation source. If the required radiation power is not too high, such as for laser printing, the modulation can be performed by the electronically driven beam deflectors 42 described herein above.

Surface inspection includes inspection of components, such as printed circuit boards, during a manufacturing process or inspection the quality of finished products, but also reading, or viewing photographs or drawings. Surface inspection may be carried out in reflection or in transmission. For inspection of a reflective surface, successive positions on the surface are illuminated by a scanning spot generated by the scanning device described herein above and the reflected radiation, which is modulated by details at said positions is captured by a detection system, comprising one or more radiation-sensitive detector elements. Such a detection system, which converts the radiation into an electrical signal, is shown in FIG. 1 and denoted by reference number 70. This detection system is arranged such that it does not obscure the scanning beam.

For inspection in transmission, the object to be inspected, for example a photographic negative is illuminated by a radiation source arranged at the object side remote from the scanning device. The radiation passing through the object may be scattered, partly absorbed and/or partly reflected by the object details so that it is modulated by the information details. The scanning device is now used in the reversed direction on a radiation-sensitive detection system, is now arranged at the position of the radiation source in FIGS. 2-5. The momentary angular position of the polygon mirror determines which point-like portion of the object is momentarily seen by the detection system. The radiation from this point is guided via the Banana Mirror System 22, the polygon mirror 16, and the main imaging system 12 to the detection system, which converts the varying intensity of the radiation from the successive points of the object into an electrical signal representing the information being read from the object. In the radiation path between the main imaging system and the detection system the radiation beam from the object meets either an additional beam deflector 42 in the case of active facet tracking or a facet tracking mirror 54 and other mirrors in case of passive facet tracking.

In this way each point of the object is imaged with great accuracy and high resolution on the detection system, ignored and thus the resolution of the scanning device is maximal.

The radiation sensitive detection system may comprise a single detection element, such as a photo diode, for detecting each time the radiation from a single point of the object, or an array of detection elements, such as in a CCD sensor, for simultaneously detecting radiation from a corresponding number of points on the object.

As a result of the facet tracking schemes described above, the tracked beam focussed by the main lens 12 and then reflected as scanning beam from one of the facets 20a-c of the polygon 16 seems to be deflected at a point that is between the surface of the momentarily illuminated facet and the rotational axis of the polygon. This point is the ideal deflection point in a post-objective scanning device comprising a Banana Mirror System for achieving full telecentricity, great radiation efficiency, negligible image aberrations and high duty cycle.

The invention claimed is:

1. An optical scanning device for scanning a surface along a line comprising:
   a radiation source unit for supplying at least one primary radiation beam,
   an optical system for focusing the at least one primary radiation beam to a spot on the surface to be scanned, and
   a rotatable polygon mirror comprising a number of mirror facets for deflecting the at least one primary radiation beam through a variable deflection angle, thereby obtaining a scanning beam, and to direct the scanning beam to a position on the surface to be scanned,
   said optical system comprising:
   a main imaging system which is arranged in a first radiation path of the scanning beam between the radiation source unit and the rotatable polygon mirror;
   a correction system which is arranged in a second radiation path of the scanning beam between the rotatable polygon mirror and the surface to be scanned, and
   facet tracking means for deflecting the at least one primary radiation beam in synchronism with rotation of the rotatable polygon mirror such that a ray of the primary beam is continuously directed at substantially a center of a facet of the mirror facets that is momentarily illuminated by the at least one primary radiation beam,
   wherein the tracking means are operable to create a deflection point for the scanning beam, said deflection point being located between a center of rotation of the rotatable polygon mirror and the facet upon which the at least one primary radiation beam is momentarily incident.

2. The scanning device as claimed in claim 1, wherein the facet tracking means are active tracking means constituted by a beam deflector arranged in a third radiation path between the radiation source unit and the main imaging system.

3. The scanning device as claimed in claim 2, wherein an additional lens is arranged between the beam deflector and the main imaging system to magnify the deflection produced by the beam deflector.

4. The scanning device as claimed in claim 2, wherein the beam deflector comprises a galvanometer mirror.

5. The scanning device as claimed in claim 2, wherein the beam deflector comprises a piezo electric deflector.

6. A scanning device as claimed in claim 2, wherein the beam deflector comprises an acousto-optical deflector.

7. The scanning device as claimed in claim 2, wherein the beam deflector comprises an electro-optical deflector.

8. The scanning device as claimed in claim 1, wherein the facet tracking means are passive means comprising a facet tracking mirror, which receives the at least one primary radiation beam via a first reflection at the mirror facet and reflects the beam to the mirror facet for a second reflection at this facet to deflect the at least one primary radiation beam at an angle substantially smaller than the deflection angle of the scanning beam, before guiding the at least one primary radiation beam to the main imaging system.

9. The scanning device as claimed in claim 8, wherein the facet-tracking mirror is a concave mirror.

10. The scanning device as claimed in claim 9, wherein a center of curvature of the concave mirror is located close to a rotational axis of the polygon mirror.

11. An apparatus for processing a pattern in at least a surface layer of an object, which apparatus comprises a device for scanning the object surface with a radiation beam and means to modulate the intensity of the radiation beam according to the pattern, wherein the device is a scanning device as claimed in claim 1.

12. An apparatus for point-wise retrieving details of an object, which apparatus comprises a device for scanning the object with a beam of radiation and a radiation-sensitive detection system to convert the beam of radiation from the object into an electrical signal, wherein the device is a scanning device as claimed in claim 1.

13. The apparatus as claimed in claim 12, wherein the radiation-sensitive detection system and the scanning device are arranged at the same side of the object.

14. The apparatus as claimed in claim 12, wherein the radiation-sensitive detection system is arranged at the position of a radiation source of the scanning device and radiation source is arranged at the side of the object remote from the scanning device.

15. An optical scanning device for scanning a surface along a line comprising:
- a rotatable polygon mirror having mirror facets for deflecting the beam toward the surface;
- a source unit for supplying a beam to a facet of the mirror facets; and
- a facet tracker configured to deflect the beam in synchronism with rotation of the rotatable polygon mirror;
- wherein the facet tracker is operable to create a deflection point for the beam, the deflection point being located between a center of rotation of the rotatable polygon mirror and the facet.

16. The optical scanning device of claim 15, wherein the deflection point is located substantially halfway between the center of rotation and the facet.

* * * * *